ID.

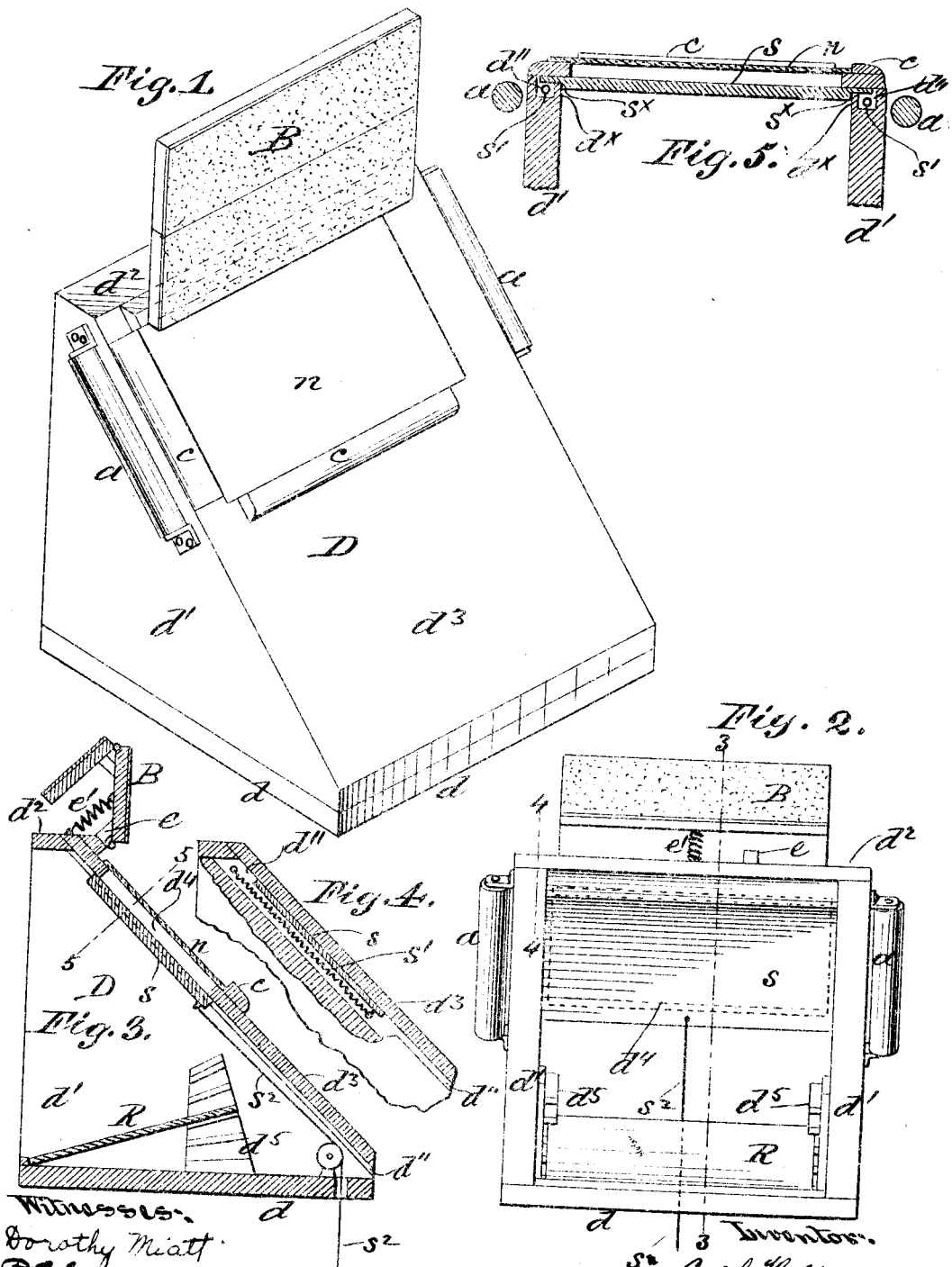

UNITED STATES PATENT OFFICE.

CARL HALPERN, OF NEWARK, NEW JERSEY.

PHOTOGRAPHIC-PRINTING DESK.

1,112,210.  Specification of Letters Patent.  Patented Sept. 29, 1914.

Application filed November 17, 1913. Serial No. 801,346.

*To all whom it may concern:*

Be it known that I, CARL HALPERN, a citizen of the United States, and a resident of the city of Newark, county of Essex, and State of New Jersey, have invented certain new and useful Improvements in Photographic-Printing Desks, of which the following is a specification.

The object of my invention is to afford a simple, cheap but effective desk for conveniently and expeditiously printing from photographic negatives, either plate or film, one adapted to the requirements of either the amateur or the professional photographer.

The invention consists in the combination and construction of parts herein described and claimed specifically, a distinctive feature being the use of a retractile curtain or shutter arranged to automatically shut off the light and quickly terminate the exposure when released as hereinafter fully set forth.

In the accompanying drawings, Figure 1, is an isometrical view of my photo-printing desk; Fig. 2, a rear view thereof; Fig. 3, a vertical sectional elevation taken upon plane of line 3—3 Fig. 2; Fig. 4, a sectional detail taken upon plane of line 4—4 Fig. 2; Fig. 5, a transverse sectional diagram taken upon plane of line 5—5 Fig. 3, through the upper part of the desk only, certain details not in section being omitted.

The desk D, is formed primarily of a base $d$, side members $d'$, $d'$, top $d^2$, and inclined front $d^3$, the latter being formed with the light aperture $d^4$. The rear of the desk is open and adapted to be inserted between the sill and raised lower sash of a window,—the sash resting against the top $d^2$, and the space at the side or sides of the desk being curtained off to exclude the light except as admitted through the exposure aperture $d^4$. This is where day light is to be used to effect the printing. Where artificial light is to be used it is suitably arranged in or at the back of the desk, as may be found most expedient.

A reflector R, is positioned within the desk, the rear edge resting upon the base $d$, and the front edge being supported upon and between parallel rack shoulders $d^5$, $d^5$, arranged in coincidence upon the inner sides of the members $d'$, $d'$. By this means the reflector may be set in accordance with requirements to meet or compensate for external light conditions, the degree of inclination being raised, for instance when the sun is near the horizon, and lowered when it is at or near the meridian.

Normally the exposure aperture $d^4$, is closed by a slidable curtain or shutter $s$, controlled by retractile springs $s'$, $s'$, set in grooves $d''$, $d''$, formed in the inclined edges of the side members $d'$, $d'$,—the lower end of each of said retractile springs $s'$, $s'$, being attached to the edge of the shutter $s$, which protrudes into the groove $d''$, on that side of the desk, and the upper end of each spring being secured to the side member, as indicated more particularly in Figs. 4 and 5. The inner shorter side wall $d^x$, $d^x$, of each groove $d''$, $d''$, acts as a supporting guide for the shutter $s$, which is drawn to make an exposure against the resistance of the retractile springs $s'$, $s'$, by means of a flexible connection $s^2$, adapted to be actuated either by hand or through the medium of a pedal. Shoulders $s^x$, on the shutter rest against the shorter side walls $d^x$, of the grooves $d''$, and preserve the alinement and easy travel of the shutter.

$n$, represents either a negative to be printed from, or a plate of glass for the support of a film if the latter is to be printed from, in which case the film is passed under rollers $a$, $a$, mounted on the side members $d'$, $d'$, parallel to the inclined front $d^3$, in such manner as to act as guides to preserve the alinement of the film strip and keep it taut.

The negative or glass support $n$, is positioned over the exposure aperture $d^4$, by means of guiding and supporting shoulders $c$, $c$, parallel to the adjacent edges of said opening, which shoulders may also be used as gages for positioning the sensitized paper to be exposed to the action of light admitted through the aperture $d^4$, when the shutter $s$, is withdrawn temporarily by means of the flexible connection $s^2$. The sensitized paper is held down against the negative during exposure by means of a sectional pressure back B, hinged to the top $d^2$, of the desk and held open normally against a stop $e$, by a retractile spring $e'$, as shown in Fig. 3,—said pressure back B, being actuated in use by hand against resistance of the spring $e'$, in a manner well known in the art.

The glass support or negative $n$, resting directly upon the flat inclined front $d^3$, of the desk, it is obvious that various sizes of negatives may be accommodated; and the device is also adapted to printing from different or selective parts of the same negative.

The device is especially adapted for the rapid printing of the highly sensitized papers at present in vogue; while equally adapted to time exposure required by dense negatives, since the flexible cord or connection $s^2$, gives the operator direct and absolute control of the shutter $s$, and the retractile springs $s'$, $s'$, insure instantaneous closure of the exposure aperture $d^3$, when the shutter is released.

It is to be noted that the retractile springs $s'$, $s'$, are so situated as to be entirely concealed and protected and hence are not liable to injury or derangement, their alinement within the grooves insuring an even tension on both sides of the shutter and thereby obviating binding or undue frictional contact.

What I claim as my invention and desire to secure by Letters Patent is,

1. In a photo-printing device of the character designated the combination of the inclined front formed with the exposure aperture and gage shoulders, of the side members each formed with a groove for the support of the edge of a shutter, said shutter mounted in and between said grooves retractile springs situated in said grooves and attached to said shutter and to stationary parts, and a flexible connection for actuating said shutter against the resistance of said retractile springs, as and for the purpose set forth.

2. In a photo-printing device of the character designated the combination of the inclined front formed with the exposure aperture and gage shoulders, of the grooved side members each formed with a groove for the support of the edge of a shutter, said shutter mounted in and between said grooves, retractile springs situated in said grooves and attached to said shutter and to stationary parts, a flexible connection for actuating said shutter against the action of said retractile springs, and one or more film guide rollers mounted on the side members parallel to the exposure aperture as and for the purpose described.

3. In a photo-printing device of the character designated the combination of the inclined front formed with the exposure aperture and gage shoulders, of the grooved side members each formed with a groove for the support of the edge of a shutter, said shutter mounted in and between said grooves, retractile springs situated in said grooves and attached to said shutter and to stationary parts, a flexible connection for actuating said shutter against the action of the said retractile springs, a reflector within the desk below the exposure aperture, and means for adjusting said reflector in inclination, as and for the purpose set forth.

CARL HALPERN.

Witnesses:
 GEO. WM. MIATT,
 DOROTHY MIATT.